United States Patent

(12) United States Patent
Safar

(10) Patent No.: US 10,002,729 B2
(45) Date of Patent: Jun. 19, 2018

(54) ELECTRONIC DEVICE WITH SLIDABLE CONTROL BUTTON

(71) Applicant: Samir Hanna Safar, San Diego, CA (US)

(72) Inventor: Samir Hanna Safar, San Diego, CA (US)

(73) Assignee: Samir Hanna Safar, San Diego, CA (US)

( * ) Notice: Subject to any disclaimer, the term of this patent is extended or adjusted under 35 U.S.C. 154(b) by 0 days. days.

(21) Appl. No.: 15/355,207

(22) Filed: Nov. 18, 2016

(65) Prior Publication Data
US 2018/0144887 A1 May 24, 2018

(51) Int. Cl.
*H01H 15/10* (2006.01)
*H01H 15/04* (2006.01)

(52) U.S. Cl.
CPC ............ *H01H 15/10* (2013.01); *H01H 15/04* (2013.01); *H01H 2217/024* (2013.01); *H01H 2217/048* (2013.01); *H01H 2221/014* (2013.01); *H01H 2231/022* (2013.01)

(58) Field of Classification Search
CPC ........ H01H 15/10; H01H 15/01; H01H 15/00; H01H 2217/024; H01H 2217/048; H01H 2231/022; H01H 3/00; H01H 3/02; H01H 3/08; H01H 3/12; H01H 3/161; H01H 9/02; H01H 9/04; H01H 13/50; H01H 13/70; H01H 13/705; H01H 13/76; H01H 2003/00; H01H 2003/02; H01H 2003/08; H01H 2003/085; H01H 2003/161; H01H 2009/02; H01H 2201/00; H01H 2201/01; H01H 2201/004; H01H 2201/008; H01H 2221/00; H01H 2221/01; H01H 2221/014; H01H 2221/016; H01H 2221/018; H01H 2221/032; H01H 2233/00; H01H 2233/004; H01H 2233/002; H01H 2233/01; H01H 2233/03; H01H 2233/07; H01H 2233/09
See application file for complete search history.

(56) References Cited

U.S. PATENT DOCUMENTS

2016/0086456 A1* 3/2016 Wittenberg .............. G08B 5/36 455/566

* cited by examiner

*Primary Examiner* — Anthony R. Jimenez
(74) *Attorney, Agent, or Firm* — Samir Hanna Safar

(57) ABSTRACT

The slidable control button device provides inputs to an electronic communication device such as a smartphone. When the slidable control button is moved to positions within a grooved path, it acquires additional functionalities. These include (a) gaming console hand devices for both left and right hand thumbs of gamers, (b) pressing on the left or right edge of the button will control functions of software of apps, (c) motion detection (d) sending and receiving data related to measuring motion, speed or acceleration, temperature, and communicating with the software applications installed in the smartphone.

12 Claims, 3 Drawing Sheets

ELECTRONIC DEVICE WITH SLIDABLE CONTROL BUTTON

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

FIELD OF THE INVENTION

The present invention belongs to the field of button control for electronic devices such as mobile telephones, computing devices, and more particularly relates to button controls for electronic devices such as smartphones for functions such as powering the device, volume control, camera, authentication by scanning of finger, gaming applications.

BACKGROUND OF THE INVENTION

Presently, communication devices such as smart mobile phones are provided with various functionalities. Many basic functional features are still provided by means of few buttons at a fixed location of the phone device. Control of volume, vibrational mode and switching on and off of power is done using specific hard keys or buttons. Continuous efforts are on to provide enhanced functional features to the control buttons of present day electronic communication devices.

Below are given some of the known prior art. US patent application 20080246731 discloses a Backside Control Utility, BCU. The invention is an innovative way of BCU touchpad and keyboard in various applications as backside control utility, meaning locating touchpad and keyboard at a back of various hosting devices such as cellular phones, Tablet PCs, laptops, portable displays, portable music players and others. The invention can be embedded into a hosting device at manufacturing stage as BCU touchpad and keyboard components at the back of hosting device and comprises custom or universal attachment system, that allow BCU platform to be attached to the back of any device via universal attachment system, or to a specific device via custom attachment system. Navigating BCU responds to a regular cursor or text entry navigation. The invention, however, is used in single handed or dual handed navigation.

US patent application 20160086456 discloses an electronic device with electrically controlled button indicator wherein electrical components may be mounted in an interior portion of the housing. A display may be mounted to the housing to display images for a user. A button may have a movable button member that moves inwardly and outwardly with respect to the housing. Control circuitry can use a sensor to monitor button press activity on the button. A visual indicator such as an electrophoretic display or other low power display may be mounted on a protruding portion of the button member. The control circuitry can alter the visual appearance of the visual indicator in response to detection of button presses on the button member. The button may be sealed to prevent intrusion of moisture into the interior of the housing.

US patent application 20140004907 pertains to a mobile terminal including a terminal body having a front surface and a rear surface, a display module disposed on the front surface and configured to display visual information, and a rear input unit disposed on the rear surface and configured to sense an input of a control command, wherein the rear input unit includes a button member externally exposed from the rear surface, a first sensing unit disposed to overlap the button member and configured to sense a push input applied onto the button member, and a second sensing unit disposed to overlap the button member and configured to sense a touch input applied onto the button member.

Despite various improvements and progress in the field, some of the major obstacles that still exist, involve having a specific number of buttons to perform a set of given functions. This leads to higher manufacturing cost since several components are involved. Also the assembling and manufacturing effort is more.

Another major limitation of existing prior art is that since the position of control buttons on the device is fixed, it is not user friendly from the perspective of left handed person or right handed person. Many of the devices have the buttons located centrally which is inconvenient for one handed operation, which is currently what most people use to operate devices like smartphones. According to the make/design of the smartphone, different protective casings are required which have the necessary openings or adaptations to accommodate the side buttons. Many times in order to accommodate different functional features, several control buttons have to be pressed together or in a combination, which can be quite cumbersome for a user.

Accordingly, improvements are needed in the existing methods and structures that negate the above shortcomings in the existing systems.

The purpose and methodology of all the above inventions that are part of prior art do not envisage the unique embodiment of an electronic device with slidable control buttons, thus eliminating fixed buttons located on the sides of the electronic device for various functions such as controlling volume, power on and off, vibrational mode, which also reduce the cost of manufacturing and facilitate easy one hand operation for a user.

The scope of the invention is to be determined by the terminology of the following description, claims, drawings and the legal equivalents thereof.

SUMMARY OF THE INVENTION

The present invention may be summarized, at least in part, with reference to its objects.

It is therefore a primary objective of the present invention to provide a button control device for an electronic communication device, such as a smart mobile phone, having a slidable control button that is capable of multiple functionalities as per the requirement of the user. Depending on its position, the button is capable of performing different functions. The slidable button is a mechanical component that moves along or inside a grooved path provided, preferably, on the front surface of the electronic device, below the display screen.

Another object of the present invention is to eliminate the need for multiple buttons extruding sideways from the device.

A further object of the present invention is to provide a single slidable button that makes it easy for a user operating the device be it a left handed user or a right handed user or an ambidextrous user.

Another object of the present invention is to provide a slidable control button that is easy to manufacture and assemble.

Yet another object of the present invention is to provide a slidable control button that is useful for applications like gaming, medical innovations and healthcare.

The invention described herein relates to a slidable control button device provided in an electronic communication device such as a smartphone. The device comprises of a slidable button that is capable of movement in two main embodiments.

In a first embodiment of the present invention, the slidable button device is provided with a guiding member that engages with a grooved slot and slides along in the slot, such that the top surface of the slidable button device is raised above the surface of the smartphone display screen.

In a second embodiment of the present invention, the slidable button device is disposed within a grooved track and slides within the track, such that the top surface of the slidable button device is coincident or flush with the surface of the smartphone display screen.

In both the embodiments, the slidable button further comprises of: a left side sensing portion disposed to overlap a left button member, a middle sensing portion, and a right side sensing portion disposed to overlap a right button member. The sensing portions are configured to sense user inputs in the form of pressure or touch.

These button members (left and right buttons) and are not separate members but integral (non-removable) parts of the slidable button device. The grooved track or slot, is provided on the front surface of the smartphone, preferably below the display screen and is in the configuration of an arch.

When the slidable button is moved to the extreme left or extreme right position center in the grooved track or slot, the left side sensing portion, the middle sensing portion and the right side sensing portion acquire additional functionalities. These include—(a) gaming console hand devices for both left and right hand thumbs of gamers which gives more sense of touch, (b) pressing on the left or right edge of the button will control functions of software of apps, (c) motion detection and communicate with smartphone software programs (d) sending and receiving data related to measuring motion, speed or acceleration, temperature with an option to select either sending or receiving the data, and communicating with the software applications installed in the smartphone.

The above summary is intended to illustrate exemplary embodiments of the invention, which will be best understood bin conjunction with the detailed description to follow, and are not intended to limit the scope of the invention.

The present invention offers advantages to users by eliminating several buttons on the sides of the phone for different functionalities like control of volume, vibrator mode, camera and on and off/on buttons, screenshot capture and also reduces the cost of manufacturing. The easy single hand operation is compatible with both left handed and right handed persons.

Additional objects and embodiments of the invention will be set forth in part in the description which follows, and in part will become apparent to those skilled in the art upon examination of the following, or may be learned by practice of the invention. Thus these and other objects of the present invention will be more readily apparent when considered in reference to the following description and when taken in conjunction with the accompanying drawings.

Figure 1:
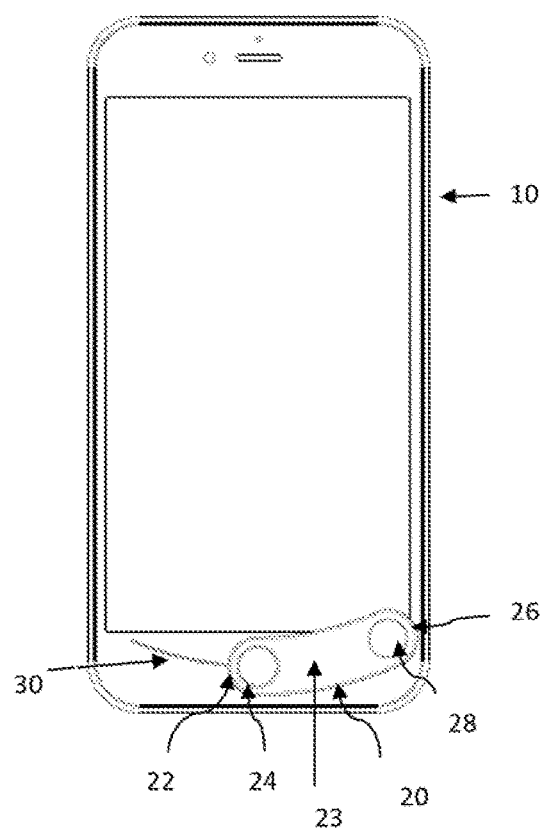
FIGS. 1 through 4 represent illustrative diagrams depicting the slidable control button device in a first embodiment of the present invention.

LIST OF REFERENCE NUMBERING 10 labels an electronic communication device
20 labels a slidable control button device
30 labels a grooved slot
40 labels a grooved track
22 labels a left side sensing portion
23 labels a middle sensing portion
24 labels a left button member
26 labels a right side sensing portion
28 labels a right button member

DETAILED DESCRIPTION OF THE INVENTION

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

The following description is presented to enable any person skilled in the art to make and use the invention, and is provided in the context of particular applications of the invention and their requirements.

The invention described herein relates to a slidable control button device provided in an electronic communication device such as a smartphone. The device comprises of a slidable button that is capable of movement along a grooved path as described in two main embodiments.

In a first embodiment of the present invention, the slidable button device is provided with a guiding member that engages with a grooved slot and slides along in the slot, such that the top surface of the slidable button device is raised above the surface of the smartphone display screen.

In a second embodiment of the present invention, the slidable button device is disposed within a grooved track and slides within the track, such that the top surface of the slidable button device is coincident or flush with the surface of the smartphone display screen.

For clarity and consistency, the slidable button device in the first embodiment will move along a grooved slot (a thin guided path), whereas the slidable button device in the second embodiment will be move within a grooved track (which is an inset or a depression). Generically, a grooved slot and a grooved track are commonly referred to as a grooved path in this application. Thus any reference to a grooved path can denote either a grooved slot or a grooved track.

In both the embodiments, the slidable button further comprises of: a left side sensing portion disposed to overlap a left button member, a middle sensing portion, and a right side sensing portion disposed to overlap a right button member. The sensing portions are configured to sense user inputs in the form of pressure or touch. Besides the sensing portions acquire additional functionalities by virtue of their position within the grooved slot/track.

These button members (left and right buttons) and are not separate members but integral (non-removable) parts of the slidable button device. The grooved path, is provided on the front surface of the smartphone, preferably below the display screen and is in the configuration of an arch.

The slidable button device (and thereby the left and right button members provided on it) can occupy three main positions within the grooved path—an extreme left position, an extreme right position and a central bottom position. The slidable button connects to the inner electronic controls of the smartphone by means of a conductive material lining provided around the contour edges of the slidable button and also around the inside edges of the grooved path. In addition, the left button member and the right button member are in communication with the slidable button through the conductive material lining.

The conductive material lining along the contour edges of the slidable button communicates with the smartphone inner logic board, operating software and smartphone applications.

When the right button is in the central bottom position, it performs all the functions of the existing side buttons of the smartphone, such as control of volume, vibrational, silent mode, camera on/off, laser sensor, authentication by fingerprint scanning. Any of the members, i.e. the left button, the middle portion and the right button of the slidable button can be configured to perform one or more of these functions.

In an embodiment of the present invention, thus the central bottom position represents the core functions or existing functions such as control of volume, vibrational, silent mode, camera on/off, laser sensor, authentication by fingerprint scanning. Thus the button portion that occupies this position is capable of performing these functions.

The left button, the middle portion and the right button, may be provided with laser sensor and heat sensors for additional functionalities. These can be used for sending or receiving signals.

When the slidable button is moved to the extreme left or extreme right position center in the grooved slot or track, the left button, the middle portion and the right button acquire additional functionalities. These include—(a) gaming console hand devices for both left and right hand thumbs of gamers which gives more sense of touch, (b) pressing on the left or right edge of the button will control functions of software of apps, (c) motion detection and communicate with smartphone software programs (d) sending and receiving data related to measuring motion, speed or acceleration, temperature with an option to select either sending or receiving the data, and communicating with the software applications installed in the smartphone. Additional functionalities can be provided for user authentication and for measures such as emergency call.

In a preferred embodiment of the invention, the slidable control button device is capable of accepting user input by a combination of a selected portion, touch, pressure applied and the position in the grooved track mapped to acquire predetermined functional features.

With reference to FIGS. 1 through 4, a first embodiment of the present invention is depicted, wherein the slidable control button device moves along a grooved slot. In this embodiment, the top surface of the slidable control button device is above or raised as compared to the top surface of the display screen of the smartphone. 10 depicts an electronic communication device, such as, for example, a smartphone. 20 denotes a slidable control button device, engaged with a grooved slot 30. The left side sensing portion 22 of the slidable button 20 is disposed to overlap a left button member 24, while the right side sensing portion 26 of the slidable button 20 is disposed to overlap a right button member 28. 23 denotes the middle sensing portion of the slidable control button device 20.

In FIG. 1, the left button member 24 occupies the central bottom position.

Figure 2:
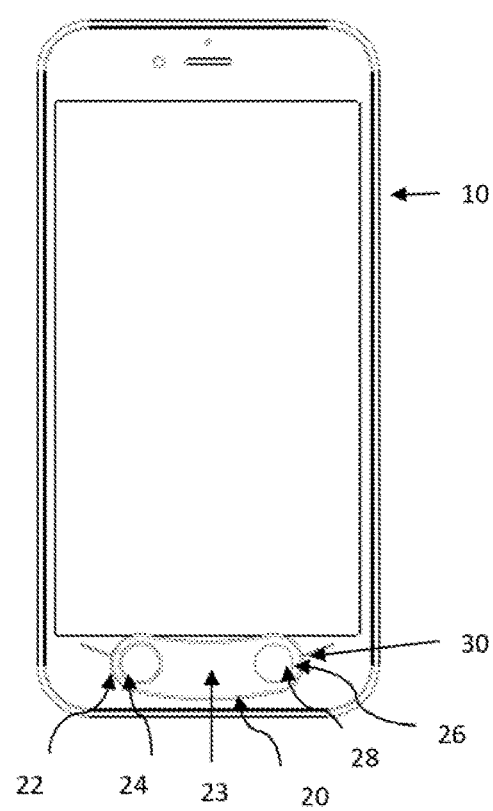

In FIG. 2, the middle sensing portion 23 occupies the central bottom position.

Figure 3:
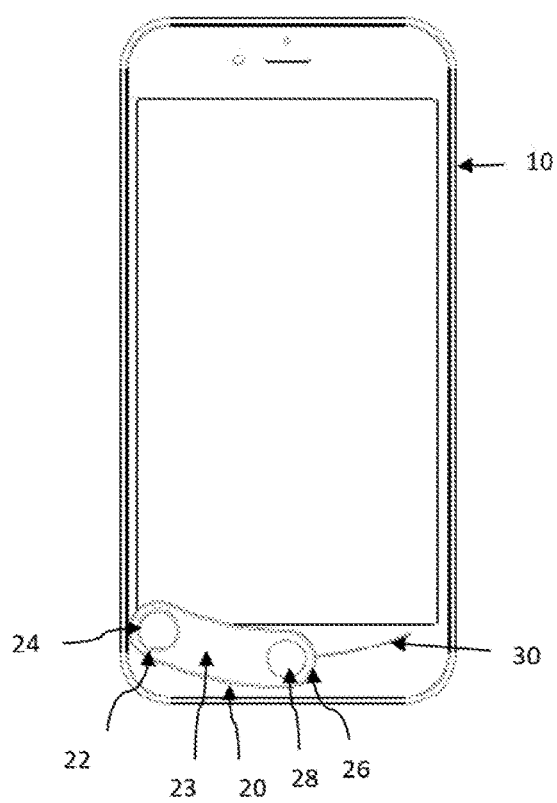

In FIG. 3, the right button member 26 occupies the central bottom position.

Figure 4:
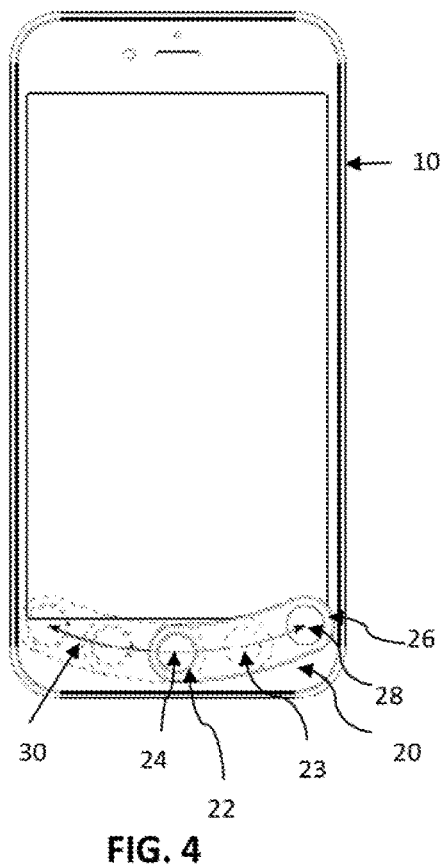

FIG. 4 depicts that the slidable control button 20 is capable of moving within the grooved slot 30, and occupying different positions along it.

Figure 5:
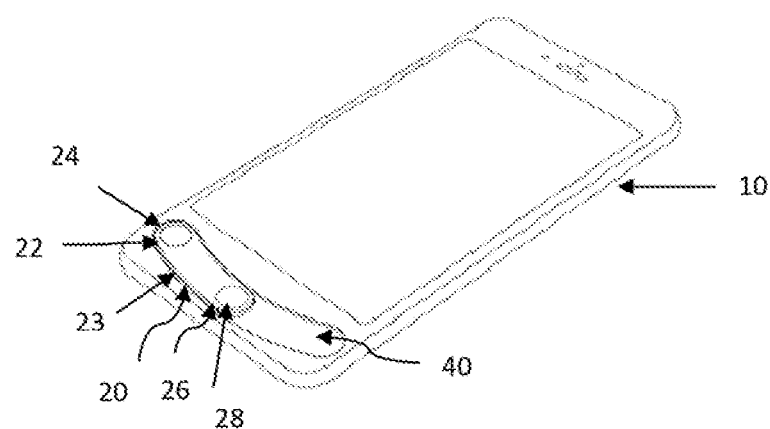
FIGS. 5 and 6 represent illustrative diagrams depicting the slidable control button device in a second embodiment of the present invention.
Figures 6, 7:
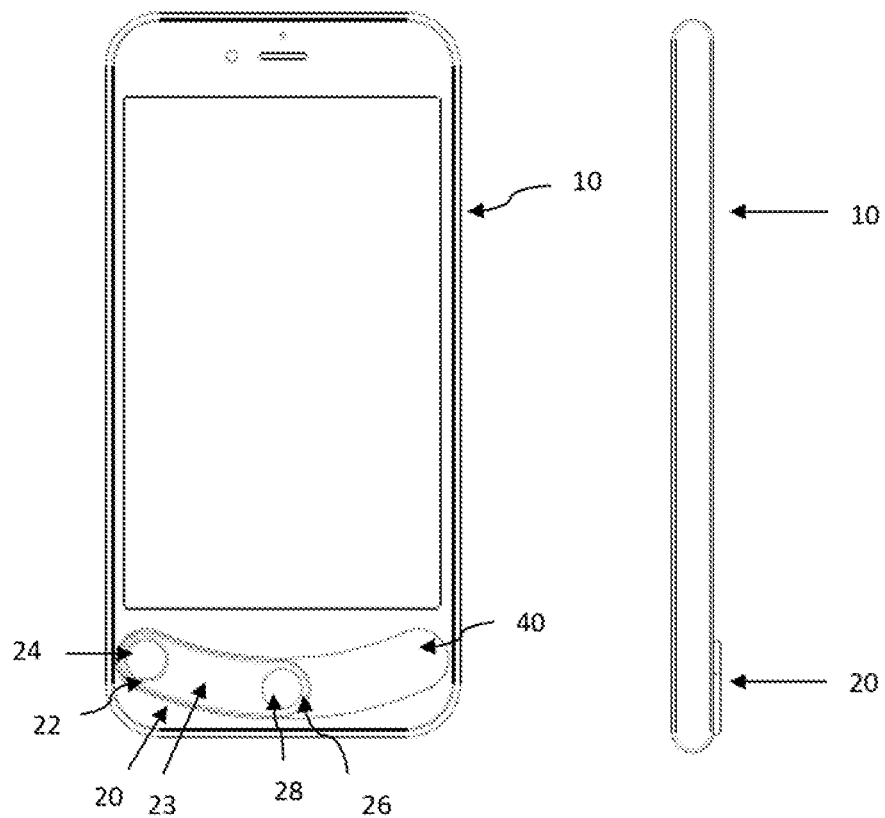
FIG. 7 is an illustrative diagram depicting the present invention in a sideways view.

With reference to FIGS. 5 and 6, a second embodiment of the present invention is depicted, wherein the slidable control button device is disposed within a grooved track and moves within the track. In this embodiment, the top surface of the slidable control button device is flush with the top surface of the display screen of the smartphone. 10 depicts an electronic communication device, such as, for example, a smartphone. 20 denotes a slidable control button device, disposed within a grooved track 40. The left side sensing portion 22 of the slidable button 20 is disposed to overlap a left button member 24, while the right side sensing portion 26 of the slidable button 20 is disposed to overlap a right button member 28. 23 denotes the middle sensing portion of the slidable control button device 20.

FIG. 7 is a sideways view of an embodiment of the present invention.

Accordingly the present invention is a slidable control button device capable of providing user inputs to an electronic communication device, such as a smart phone, comprising, as integral members: a left side sensing portion that is disposed to overlap a left button member, a middle sensing portion, and a right side sensing portion that is disposed to overlap a right button member, such that the left button member and the right button member are characterized with a conductive material lining along an inside peripheral edge, and the left side sensing portion, the middle sensing portion and the right side sensing portion are capable of receiving input from a user, a grooved path, characterized with a conductive material lining along an inside peripheral edge, wherein the slidable control button device is capable of moving along the grooved path, and configured to occupy three predefined positions within the grooved path including: an extreme left position, an extreme right position and a central bottom position, and the slidable control button device is characterized by a conductive material lining provided around an internal contour edge, and is in communication with the electronic communication device through its inner logic board, operating software and applications, such that predetermined functionalities are associated with different positions of the slidable control button in the grooved path.

In a first embodiment, the slidable control button device is engaged with the grooved slot such that the top surface of the slidable control button device is raised as compared to the top surface of the display screen of the electronic communication device.

In a second embodiment, the slidable control button device is disposed within the grooved track such that the top surface of the slidable control button device is coincidental or flush with the top surface of the display screen of the electronic communication device.

In an embodiment of the invention, preselected functionalities of the electronic communication device are associated with the central bottom position.

In an embodiment of the present invention, the slidable button can be divided into a plurality of button control members and need not be restricted to two button members only.

In an embodiment of the present invention, the slidable button can be positioned at a plurality of positions within the grooved track and need not be limited to three positions only.

In one embodiment of the invention, the grooved track or slot can be configured in different shapes and positions such as along a vertical side to the left side or the right side of the screen display, or above the screen display, or in a plurality of rows or columns, arranged in a parallel, perpendicular or zigzag manner, or in given geometric configurations, in symmetric or asymmetric shapes.

In one embodiment of the invention, the left and right buttons are capable of receiving user input by means of sensors activated by touch, pressure, laser, fingerprint scanning, audio, heat or biometric means.

In an embodiment of the invention, the left and right button functionalities can be swapped depending on their position and user preference. Thus functionalities of button members can be switched depending on their position in the grooved path.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

In this application, the terminology 'embodiment' can be used to describe any aspect, feature, process or step, any combination thereof, and/or any portion thereof, etc.

In an alternate embodiment, the electronic communication device is not restricted to a smartphone or a smart watch, but can also include a cellular phone, a personal digital assistant (PDA), a GPS device, a smartbook, a netbook, a notebook, an ultra-mobile personal computer and a wearable computing device.

Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

I claim:

1. A slidable control button device for use in conjunction with an electronic communication device, comprising:
a left side sensing portion that is disposed to overlap an integral left button member, a middle sensing portion, a right side sensing portion that is disposed to overlap an integral right button member,
such that the left button member and the right button member are provided with a conductive material lining along an inside peripheral edge, and the left side sensing portion, the middle sensing portion and the right side sensing portion are capable of receiving input from a user,
a grooved path, provided with a conductive material lining along an inside peripheral edge,
wherein the slidable control button device is capable of moving along the grooved path, and configured to occupy three predefined positions within the grooved path including: an extreme left position, an extreme right position and a central bottom position,
and the slidable control button device is provided with a conductive material lining provided around an internal contour edge, and is in communication with the electronic communication device through an inner logic board of the electronic communication device, operating software and applications of the electronic communication device,
such that predetermined functionalities are associated with different positions of the slidable control button in the grooved path.

2. The slidable control button device as claimed in claim 1 wherein the grooved path is provided on the front surface of the electronic communication device below the display screen and is in a configuration of an arch.

3. The slidable control button device as claimed in any of the claim 1 or 2, wherein the grooved path is configured as a grooved slot wherein the slidable control button device engages with the grooved slot such that the top surface of the slidable control button device is raised as compared to a top surface of the display screen of the electronic communication device.

4. The slidable control button device as claimed in any of the claims 1 or 2, wherein the grooved path is configured as a grooved track wherein the slidable control button device is disposed within the grooved track such that a top surface of the slidable control button device is coincidental or flush with a top surface of the display screen of the electronic communication device.

5. The slidable control button device as claimed in any of the claim 1 or 2, wherein the number of integral button members is more than three.

6. The slidable control button device as claimed in any of the claim 1 or 2, wherein the grooved path is configured in shapes and positions including: along a vertical side to the left side or the right side of the display screen, above the screen display, in a plurality of rows or columns, arranged in a parallel, perpendicular, zigzag manner, in given geometric configurations, in symmetric or asymmetric shapes.

7. The slidable control button device as claimed in any of the claim 1 or 2, wherein the user input is provided by means of sensors activated by touch, pressure, laser, audio, heat, fingerprint scanning or biometric means.

8. The slidable control button device as claimed in any of the claim 1 or 2, wherein the electronic communication device is selected from a group consisting of a smart phone, a mobile phone, a cellular phone, a personal digital assistant (PDA), a GPS device, a smartbook, a netbook, a notebook, an ultra-mobile personal computer and a wearable computing device.

9. The slidable control button device as claimed in any of the claim 1 or 2, wherein the additional functionalities acquired by the slidable button include (a) gaming console hand devices for both left and right hand thumbs of gamers which gives more sense of touch, (b) pressing on the left or right edge of the button will control functions of software of apps, (c) motion detection and communication with smartphone software programs (d) sending and receiving data related to measuring motion, speed or acceleration, temperature with an option to select either sending or receiving the data, and communicating with a software application installed in the smartphone.

10. The slidable control button device as claimed in any of the claim 1 or 2, wherein the number of positions that can be occupied by the slidable button within the grooved path is more than three.

11. The slidable control button device as claimed in any of the claim 1 or 2, wherein preselected functionalities of the electronic communication device are associated with a central bottom position.

12. The slidable control button device as claimed in any of the claim 1 or 2, wherein functionalities of the button members can be switched depending on their position in a grooved path.

* * * * *